United States Patent
Wang et al.

(10) Patent No.: US 11,182,816 B2
(45) Date of Patent: Nov. 23, 2021

(54) METHOD AND DEVICE FOR PROCESSING ELECTRONIC COUPON LINK

(71) Applicant: ADVANCED NEW TECHNOLOGIES CO., LTD., Grand Cayman (KY)

(72) Inventors: Yun Wang, Hangzhou (CN); Fang Wang, Hangzhou (CN); Zhao Chen, Hangzhou (CN); Jie Yan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 7 days.

(21) Appl. No.: 16/655,620

(22) Filed: Oct. 17, 2019

(65) Prior Publication Data
US 2020/0051114 A1    Feb. 13, 2020

Related U.S. Application Data

(63) Continuation of application No. PCT/CN2018/084631, filed on Apr. 26, 2018.

(30) Foreign Application Priority Data

Apr. 28, 2017 (CN) .......................... 201710295815.0

(51) Int. Cl.
*G06Q 30/02* (2012.01)

(52) U.S. Cl.
CPC ..... *G06Q 30/0222* (2013.01); *G06Q 30/0225* (2013.01)

(58) Field of Classification Search
CPC .......... G06Q 30/0208; G06Q 30/0222; G06Q 30/0225; G06Q 30/0239
See application file for complete search history.

(56) References Cited

U.S. PATENT DOCUMENTS

| 7,970,661 | B1 | 6/2011 | Abraham et al. |
| 8,494,901 | B2 | 7/2013 | Magadi et al. |

(Continued)

FOREIGN PATENT DOCUMENTS

| CN | 102354382 A | 2/2012 |
| CN | 105373927 A | 3/2016 |

(Continued)

OTHER PUBLICATIONS

CouponChief.com, https://web.archive.org/web/20161211231205/ https://www.couponchief.com/, published Dec. 11, 2016 (Year: 2016).*

(Continued)

*Primary Examiner* — Scott D Gartland
*Assistant Examiner* — Melinda Gieringer

(57) ABSTRACT

Methods, systems, and devices, including computer programs encoded on computer storage media, for processing an electronic coupon link are provided. One of the methods includes: receiving, by a server, an electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

20 Claims, 7 Drawing Sheets

(56) References Cited

U.S. PATENT DOCUMENTS

| | | | |
|---|---|---|---|
| 10,089,632 | B2 | 10/2018 | Hosp |
| 2002/0169662 | A1 | 11/2002 | Claiborne |
| 2006/0282410 | A1* | 12/2006 | Weitzman .......... G06Q 30/0207 |
| 2011/0184780 | A1 | 7/2011 | Alderson et al. |
| 2011/0196731 | A1* | 8/2011 | Christie ................ H04L 9/3263 705/14.26 |
| 2011/0313837 | A1 | 12/2011 | Katz et al. |
| 2012/0072345 | A1 | 3/2012 | Solomon et al. |
| 2012/0109737 | A1 | 5/2012 | Setty et al. |
| 2012/0143671 | A1* | 6/2012 | Hansen .............. G06Q 30/0248 705/14.39 |
| 2013/0173367 | A1* | 7/2013 | Beighley, Jr. ...... G06Q 30/0214 705/14.16 |
| 2013/0311315 | A1 | 11/2013 | Zises |
| 2014/0081750 | A1 | 3/2014 | Hosp |
| 2014/0324627 | A1 | 10/2014 | Haver et al. |
| 2014/0324690 | A1 | 10/2014 | Allen et al. |
| 2016/0005067 | A1 | 1/2016 | Warner et al. |
| 2016/0012489 | A1 | 1/2016 | Rajan et al. |
| 2016/0234192 | A1 | 8/2016 | Shao et al. |
| 2017/0004533 | A1* | 1/2017 | Boal .................. G06Q 30/0241 |
| 2018/0189029 | A1* | 7/2018 | Lahmadi ................ G06Q 50/14 |

FOREIGN PATENT DOCUMENTS

| | | |
|---|---|---|
| CN | 105956879 A | 9/2016 |
| CN | 107392640 A | 11/2017 |
| GN | 104966214 A | 10/2015 |
| TW | 201629874 A | 8/2016 |
| WO | 2012171422 A1 | 12/2012 |

OTHER PUBLICATIONS

CouponChief.com, https://web.archive.org/web/20161211231205/ https://www.couponchief.com/, published Dec. 11, 2016, with Archive. org header (Year: 2016).*

Keefe, C. How to validate coupons and promotional codes, published Mar. 2013, https://www.easypromosapp.com/blog/en/2014/03/how-to-validate-the-coupons-and-promotional-codes-you-give-away-in-promotions/ (Year: 2013).*

First Search for Chinese Application No. 201710295815.0 dated Jun. 12, 2019 (1 page).

First Office Action for Chinese Application No. 201710295815.0 dated Jun. 20, 2019 with English machine translation (24 pages).

Non-Final rejection and Search Report for Taiwanese Application No. 107108418 dated Aug. 6, 2019 (13 pages).

Written Opinion of the International Searching Authority and International Search Report for PCT Application No. PCT/CN2018/084631 dated Jul. 6, 2018 (14 pages).

International Preliminary Report on Patentability Chapter I for PCT Application No. PCT/CN2018/084631 dated Nov. 7, 2019 (12 pages).

Second Office Action for Chinese Application No. 201710295815.0 dated Jan. 7, 2020 with English machine translation (30 pages).

* cited by examiner

METHOD AND DEVICE FOR PROCESSING ELECTRONIC COUPON LINK

CROSS-REFERENCE TO RELATED APPLICATIONS

The present application is a continuation application of International Application No. PCT/CN2018/084631, filed on Apr. 26, 2018, which claims the benefit of the Chinese Patent Application No. 201710295815.0 filed with the State Intellectual Property Office (SIPO) of the People's Republic China on Apr. 28, 2017. The entire contents of the above-identified applications are incorporated by reference herein.

TECHNICAL FIELD

The embodiments of the specification relate to the field of information technologies, and in particular, to a method and device for processing an electronic coupon link.

BACKGROUND

A user sharing an electronic coupon after consumption is a common electronic consumption mode. Here, the electronic coupon may be a coupon, an electronic voucher, a red envelope, and the like. After an electronic coupon shared by a user is received, the user may further obtain a discount or reward from a merchant.

FIG. 1a to FIG. 1d are schematic diagrams of an electronic consumption mode. As shown in FIG. 1a, after a user successfully purchases a home appliance through an e-commerce application in a home appliance promotion activity organized by the e-commerce application platform, a prompt message is displayed in the interface of the e-commerce application to prompt the user to share 10 electronic coupons (that is, the electronic coupon may be received 10 times). These electronic coupons are gifted by the merchant and applicable to this home appliance promotion activity. Once the electronic coupons are all received, that is, the electronic coupon is received 10 times, the user can get a rebate of 50 yuan from the merchant. As shown in FIG. 1b, after the user clicks on a share button in the screen, an interactive control is displayed in the interface to prompt the user to select a sharing channel. After the user selects "Share to a friend", a social application is switched to the user, and the user further designates a friend and enters a chat window with the designated friend. At the same time, an electronic coupon link corresponding to the electronic coupon is sent to a friend A, as shown in FIG. 1c. When clicking on the electronic coupon link once, the friend A can receive a corresponding electronic coupon once and enjoy a certain discount when purchasing a commodity in this promotion activity.

The electronic coupon may refer to the benefits promised by an issuance entity of the electronic coupon, and the function of the electronic coupon link is that once an entity accesses the electronic coupon link corresponding to the electronic coupon, the issuance entity will be notified to bind the promised benefits to the entity.

The designated friend may not be interested in the shared electronic coupon, as shown in FIG. 1d. Therefore, in order to get the electronic coupon received 10 times to get a reward or discount, the user may share the electronic coupon to multiple different sharing channels or multiple different friends.

The electronic consumption mode shown in FIG. 1a to FIG. 1d has the following problems. 1. The user needs to frequently operate the terminal to switch back to the interface shown in FIG. 1a, and click the button to share the electronic coupon to different sharing channels or different friends. The operation may be cumbersome and cause great inconvenience to the user. 2. For an entity who receives the electronic coupon (a recipient), the recipient can receive the electronic coupon only after the recipient's friend shares the electronic coupon to the recipient. If the recipient wants to obtain different electronic coupons, the recipient has to receive the electronic coupons from different friends, which also causes great inconvenience to the recipient.

SUMMARY

Embodiments of this specification provide a method and device for processing an electronic coupon link to solve the inconvenience caused by the current electronic consumption mode to both a sharer and a recipient.

To solve the above-described technical problem, the embodiments of this specification are implemented as follows.

In one aspect, a method for processing an electronic coupon link is provided in the specification. The method may include: receiving, by a server, an electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

In another aspect, another method for processing an electronic coupon link is provided in the specification. The method may include: receiving, by a server, a first selection instruction comprising a storage identifier from a user terminal; determining, according to the storage pool identifier included in the first selection instruction, a storage pool corresponding to the storage pool identifier from a plurality of storage pools; and sending an electronic coupon link from one or more electronic coupon links stored in the storage pool to the user terminal, wherein the electronic coupon link is stored in the storage pool by the server according to the above-described first method.

In yet another aspect, another method for processing an electronic coupon link is provided in specification. The method may include: receiving, by a user terminal, an electronic coupon link generated by an issuance entity; displaying an interactive control for sending the electronic coupon link to the server; and when detecting the interactive control is triggered, sending the electronic coupon link to the server, for the server to store the electronic coupon link according to the above-described first method.

In still another aspect, a method for processing an electronic coupon link is provided in the specification. The method may include: sending, by a user terminal, a first selection instruction including a storage pool identifier to a server, for the server to return an electronic coupon link stored in a storage pool corresponding to the storage pool identifier, wherein the electronic coupon link is stored in the storage pool by the server according to the above-described first method; and receiving and displaying the electronic coupon link returned by the server.

According to a further aspect, the specification provides a device for processing an electronic coupon link. The device may include: a receiving module configured to receive an electronic coupon link from a user terminal; a first determining module configured to determine a first attribute of the electronic coupon link according to the electronic coupon link; a second determining module configured to determine, according to the first attribute, a storage pool corresponding to the first attribute from a plurality of storage pools; and a storage module configured to store the electronic coupon link in the storage pool corresponding to the first attribute, for another user terminal to obtain the electronic coupon link in the storage pool. The storage pool may store one or more electronic coupon links.

According to yet another aspect, the specification provides a device for processing an electronic coupon link. The device may include: a first receiving module configured to receive a first selection instruction comprising a storage pool identifier from a user terminal; a determining module configured to determine, according to the storage pool identifier included in the first selection instruction, a storage pool corresponding to the storage pool identifier from a plurality of storage pools; and a sending module configured to send an electronic coupon link from one or more electronic coupon links stored in the storage pool to the user terminal, wherein the electronic coupon link is stored in the storage pool by the device according to the above-described first method.

According to still another aspect, the specification provides a device for processing an electronic coupon link. The device may include: a receiving module configured to receive an electronic coupon link generated by an issuance entity; a displaying module configured to display an interactive control corresponding to a server; and a sending module configured to, when detecting the interactive control is triggered, send the electronic coupon link to the server, for the server to store the electronic coupon link according to the above-described first method.

According to a further aspect, a device for processing an electronic coupon link is provided in the specification. The device may include: a first sending module configured to send a first selection instruction including a storage pool identifier to a server, for the server to return an electronic coupon link stored in a storage pool corresponding to the storage pool identifier, wherein the electronic coupon link is stored in the storage pool by the server according to the above-described first method; and a receiving and displaying module configured to receive and display the electronic coupon link returned by the server.

According to a further aspect, the specification may provide a device for processing an electronic coupon link. The device may include one or more processors and a non-transitory computer-readable memory. The non-transitory computer-readable memory is coupled to the one or more processors and configured with instructions executable by the one or more processors to perform operations. The operations may include: receiving, by a server, the electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

According to yet another aspect, the present specification may further provide a non-transitory computer-readable storage medium for processing an electronic coupon link. The non-transitory computer-readable storage medium may store instructions executable by one or more processors to cause the one or more processors to perform operations. The operations may include: receiving, by a server, an electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

As can be seen from the above-described technical solutions provided by the embodiments of this specification, a plurality of storage pools are established on a server, and a user terminal does not need to share an electronic coupon link multiple times to a selected channel, but only needs to send the electronic coupon link to the server. The server stores the electronic coupon link in a corresponding storage pool according to a first attribute of the electronic coupon link, and then another user terminal may directly obtain the required electronic coupon link from the storage pool of the server. In this way, the convenience of sharing an electronic coupon by a sharer and receiving the electronic coupon by a recipient can be improved significantly.

BRIEF DESCRIPTION OF THE DRAWINGS

In order to illustrate the technical solutions in the embodiments of this specification or in the current technologies more clearly, the accompanying drawings used in descriptions of the embodiments or the current technologies will be briefly described below. It is apparent that the accompanying drawings in the following description are only some of embodiments recorded in this specification, and other accompanying drawings may be obtained according to these accompanying drawings without inventive efforts by those of ordinary skill in the art.

DETAILED DESCRIPTION

A method and a device for processing an electronic coupon link are provided in the embodiments of this specification.

To enable those skilled in the art to better understand the technical solutions of this specification, the technical solutions in the embodiments of this specification will be described clearly below with reference to the accompanying drawings in the embodiments of this specification. Apparently, the described embodiments are only some of rather than all of the embodiments of this specification. All other embodiments derived by those of ordinary skill in the art based on the embodiments of this specification without inventive efforts should fall within the scope of this specification.

For convenience of description, a user who performs electronic consumption and is eligible to share an electronic coupon is referred to as a "sharer" hereinafter, and a user terminal used by the sharer is referred to as a "sharer terminal". A user who receives the electronic coupon is referred to as a "recipient", and a user terminal used by the recipient is called a "recipient terminal".

The sharer in this specification may also be a recipient, and the recipient may also be a sharer, that is, the roles of the sharer terminal and the recipient terminal are interchangeable. "Sharer" in the sharer terminal and "recipient" in the recipient terminal do not constitute limitations on the functionalities of the user terminals.

The technical solutions provided in various embodiments of this specification will be illustrated in detail below with reference to the accompanying drawings.

Figure 2:
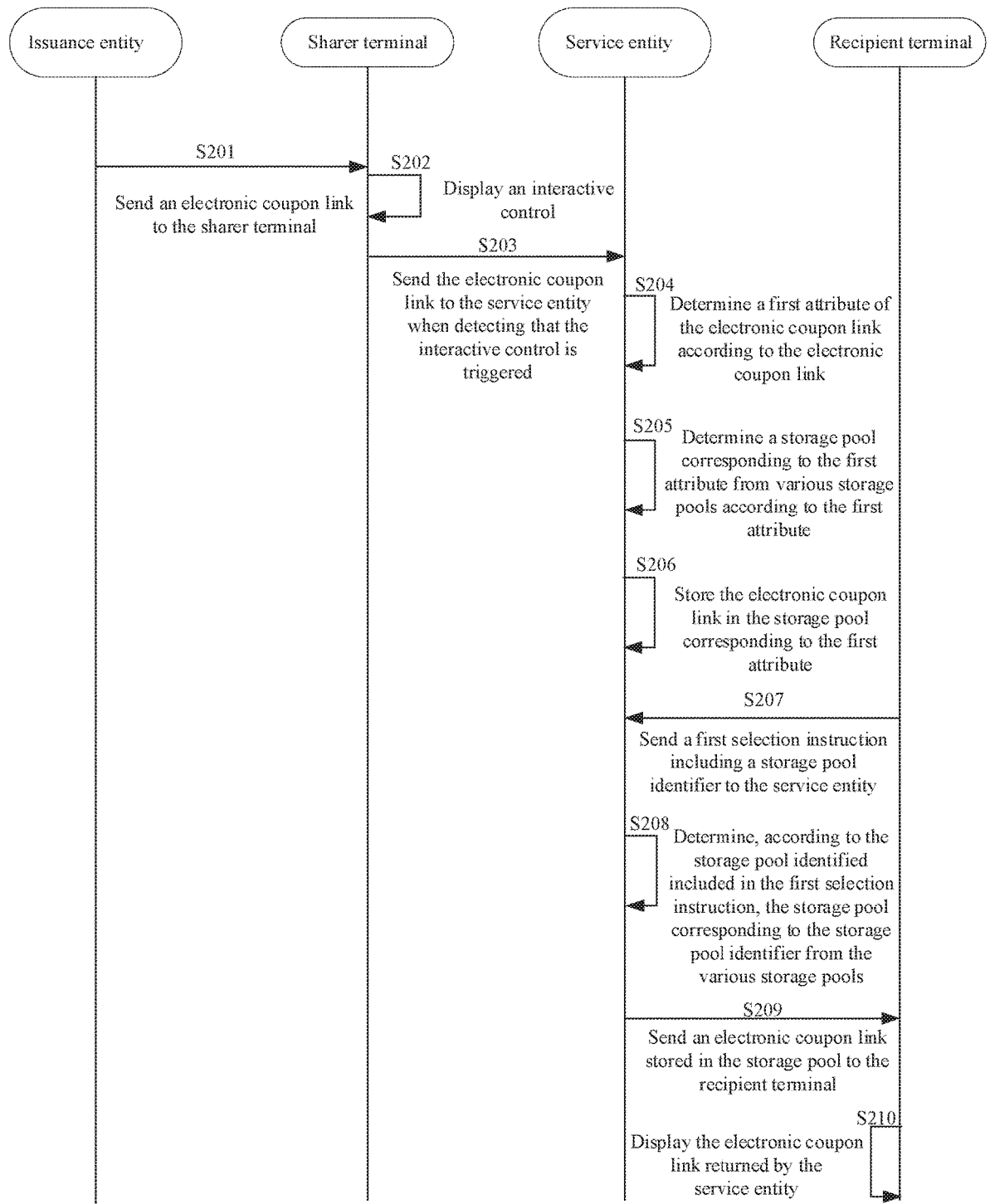
FIG. 2 is a flowchart of a method for processing an electronic coupon link according to some embodiments of this specification.

FIG. 2 is a flowchart of a method for processing an electronic coupon link according to some embodiments of this specification, including the following steps.

In S201, an issuance entity sends an electronic coupon link to a sharer terminal.

In S202, the sharer terminal displays an interactive control corresponding to a service entity. The service entity may be an execution entity added in the process of sharing and receiving the electronic coupon. In one embodiment, the service entity may be a server; in another embodiment, the service entity may be a plurality of servers.

In S203, when detecting that the interactive control is triggered, the sharer terminal sends the electronic coupon link to the service entity.

In one embodiment, the electronic coupon may be a coupon, an electronic voucher, a red envelope, and the like.

In another embodiment, the issuance entity may be a server or another computing device controlled by an entity that promises to redeem the electronic coupon and generates the electronic coupon link. The entity controlling the issuance entity may be a merchant, a plurality of merchants, a marketing manager of a joint marketing activity involving a plurality of merchants, an administrator of an e-commerce platform, and the like.

Figure 1A:
FIG. 1a to FIG. 1d are schematic diagrams of an electronic consumption mode.

In yet another embodiment, the sharer terminal may be a terminal (such as a computer or a mobile phone) or a client operated by a user who has completed electronic consumption and is eligible to share an electronic coupon. As described in the background section, after the user performs an electronic consumption successfully, a prompt message as shown in FIG. 1a may be displayed on a terminal operated by the user, prompting that the user has obtained the qualification to share a certain number of electronic coupons, and the electronic coupons may be shared by clicking on a share button.

In one example, after confirming that the user consumes successfully, the issuance entity may generate a corresponding electronic coupon link according to the electronic coupon and a user identifier of the user. Only the user is eligible to share the electronic coupon link generated based on the user identifier of the user. When the user clicks on the share button displayed on the sharer terminal, the user becomes a sharer, and the issuance entity will send the generated electronic coupon link to the sharer terminal.

The electronic coupon may refer to the benefits promised by the issuance entity of the electronic coupon, and the function of the electronic coupon link is that once an entity accesses the electronic coupon link corresponding to the electronic coupon, the issuance entity will be notified to bind the promised benefits to the entity. That is, the electronic coupon is not a specific data form, but a virtual referential concept. The data form involved in the sharing and receiving process of the electronic coupon can be an electronic coupon link. When a user shares an electronic coupon link with another user, it is equivalent to sharing the electronic coupon with the another user. When a recipient accesses the received electronic coupon link once, it is equivalent to receiving the corresponding electronic coupon.

An electronic coupon may correspond to one or more electronic coupon link. This is because the electronic coupon link needs to be shared by the corresponding sharer (consumer user). After the electronic coupon link shared by the sharer is accessed, in order to enable the issuance entity to distinguish which sharer shares the accessed electronic coupon link and further determine whether the sharer has completed the sharing task, that is, the electronic coupon shared by the sharer has been received a preset number of times, electronic coupon links shared by different sharers are required to be different. The difference may be that the electronic coupon links shared by different sharers have different fields that contain different identifiers of the sharers (user identifiers, mobile phone numbers, etc.), or other differences, so that an electronic coupon link uniquely corresponds to a sharer.

In other words, if two sharers are both eligible to share an electronic coupon, electronic coupon links bound to the two sharers are different. For example, both A and B are eligible to share a 20% off electronic coupon for a Nike shoe store. An electronic coupon link bound to A is https://www.youhui/nike/80%/jia, and an electronic coupon link bound to B is https://www.youhui/nike/80%/yi. Fields contained in the two electronic coupon links are not exactly the same. The electronic coupon link bound to A contains a user identifier of A, and the electronic coupon link bound to B contains a user identifier of B.

Figure 1B:
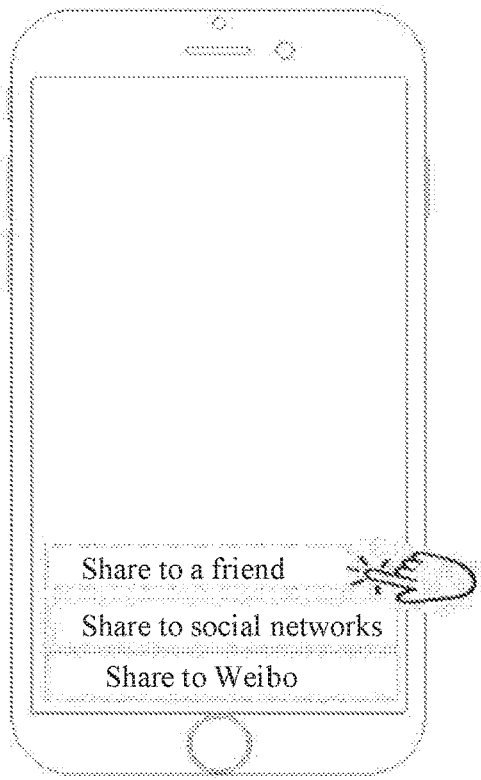
Figure 3:
FIG. 3 is a schematic diagram of an interactive control corresponding to a service entity according to some embodiments of this specification.

In the current technologies, after the user clicks on the share button, interactive controls corresponding to various sharing channels such as friends in social software and life circles (see FIG. 1b) may be popped up on the sharer terminal, for the user to choose. In some embodiments, the sharer terminal may display an interactive control for sending the electronic coupon link to the service entity, prompting the user to directly share the electronic coupon link to the service entity, as shown in FIG. 3. When the user clicks on the interactive control, the sharer terminal may send the electronic coupon link to the service entity.

The manner of sharing the electronic coupon link to the service entity shown in FIG. 3 does not constitute a limitation on the embodiment of this specification, and other sharing methods can be easily thought of. For example, a "service public account" is opened in a service application of the service entity. After "Share to a friend" is selected, the service public account is further selected in a pop-up interface (displaying a number of friends and the service public account) to share the electronic coupon to the service entity.

The service entity is an execution entity added in the process of sharing and receiving the electronic coupon in this specification. The service entity may be a server, which plays a role of relaying in the circulation of the electronic coupon link. In other words, the service entity receives and stores the electronic coupon link shared by the sharer on the one hand, and supports the recipient to obtain the stored electronic coupon link for receiving the electronic coupon on the other hand. Because of the existence of the service entity, the sharer and the recipient do not have to communicate directly, which eliminates the inconvenience caused by the direct communication between the sharer and the recipient.

In S204, the service entity determines a first attribute of the electronic coupon link according to the electronic coupon link.

In S205, the service entity determines, according to the first attribute, a storage pool corresponding to the first attribute from a plurality of storage pools.

In S206, the service entity stores the electronic coupon link in the storage pool corresponding to the first attribute.

In some embodiments, the first attribute of the electronic coupon link may be a merchant identifier corresponding to the electronic coupon link, an item identifier corresponding to the electronic coupon link, an electronic coupon type corresponding to the electronic coupon link, and other attributes. The service entity determines the attribute of the received electronic coupon link in order to store the electronic coupon link in the corresponding storage pool according to the attribute of the electronic coupon link.

The item identifier may be the name of a marketing activity, the name of a specific holiday, etc. The electronic coupon type may be the type of benefits corresponding to the electronic coupon (such as 20% off, cashback, and money off).

The manner in which the service entity determines the first attribute of the electronic coupon link is not limited in this specification. The first attribute of the electronic coupon link may be obtained based on the electronic coupon link by querying an issuance entity that generates the electronic coupon link. The first attribute of the received electronic coupon link may also be identified according to a preset identification rule. Alternatively, the electronic coupon link sent by the sharer terminal and the first attribute of the electronic coupon link may be received at the same time.

In an exemplary scenario, there are often more than one marketing activity on an e-commerce platform, such as joint marketing activities involving multiple merchants. For example, the e-commerce platform may hold various joint marketing activities such as footwear joint marketing activity, women's clothing joint marketing activity, and men's clothing joint marketing activity. Electronic coupons of the various joint marketing activities are not universally applicable, and a recipient may have a preference to request certain electronic coupons. For example, if a recipient wants to buy a pair of shoes, the recipient is probably want to receive an electronic coupon for shoes as soon as possible.

For another example, each merchant on the e-commerce platform may offer an electronic coupon only applicable to the merchant. If a recipient wants to purchase commodities of the merchant, the recipient naturally wants to receive the electronic coupon of the merchant as soon as possible.

Therefore, the service entity stores the electronic coupon link in the corresponding storage pool according to the first attribute of the electronic coupon link. Electronic coupon links having different first attributes can be stored in different storage pools. For example, electronic coupon links of different merchants are stored in storage pools corresponding to the different merchants, and electronic coupon links of different marketing activities are stored in storage pools corresponding to the different marketing activities. The recipients may quickly and efficiently receive electronic coupons of their needs.

The plurality of storage pools of the service entity may be several storage units pre-divided by configuration personnel of the service entity, and the configuration personnel may pre-configure a correspondence between the storage pool and the first attribute. In addition, some storage pools may also be storage pools created when the service entity receives an electronic coupon link and confirms that there is no storage pool corresponding to the first attribute of the received electronic coupon link.

Further, to make it more convenient for the recipient to receive the electronic coupon link, the service entity may further determine a second attribute of each electronic coupon link for the electronic coupon links stored in storage pool, and determine, according to the second attribute, a group of each electronic coupon link and add each electronic coupon link to the corresponding group.

The second attribute may be an electronic coupon type corresponding to the electronic coupon link, a merchant identifier, etc. In a specific application scenario, the second attribute of the electronic coupon link can be more specific than the first attribute. The second attribute functions to further classify electronic coupon links corresponding to a certain first attribute.

In one example, in a scenario of joint marketing, if the first attribute of the electronic coupon link is an item identifier, the second attribute of the electronic coupon link may be a merchant identifier or an electronic coupon type. If the first attribute of the electronic coupon link is a merchant identifier, the second attribute of the electronic coupon link may be an electronic coupon type.

In another example, a marketing activity having an item identifier "Double 11 Shopping Festival" is held on an e-commerce platform, the first attribute of the electronic coupon link is the item identification, and the second attribute is a merchant identifier, such as shoe store A, formula shop B, and snack shop C.

In addition, the sharer may choose to share the electronic coupon link to the service entity or choose to share the electronic coupon link to other channels at the same time, so that the sharable electronic coupon can be received at a number of times required for completing the task as soon as possible.

The process of the issuance entity generating an electronic coupon link and sending the electronic coupon link to the sharer terminal, the sharer terminal sharing the electronic coupon link to the service entity, and the service entity storing the electronic coupon link in the corresponding storage pool is described in the descriptions of steps S201 to S206. The process of a recipient obtaining an electronic coupon link from the service entity is described in the following descriptions of steps S207 to S210.

In an exemplary scenario, there are a plurality of sharers sharing electronic coupons, and there are also a plurality of recipients receiving electronic coupons. For the circulation of a plurality of electronic coupon links, the process corresponding to S201 to S206 and the process corresponding to S207 to S210 have no determined time sequence and can be performed in parallel.

In S207, the recipient terminal sends a first selection instruction including a storage pool identifier to the service entity.

In S208, the service entity determines, according to the storage pool identifier included in the first selection instruction, a storage pool corresponding to the storage pool identifier from the plurality of storage pools.

In S209, the electronic coupon link stored in the determined storage pool is sent to the recipient terminal.

In one embodiment, the recipient terminal may be a terminal or a client used by a recipient who wants to receive an electronic coupon (that is, wants to obtain an electronic coupon link from the service entity).

There can be four execution entities involved in this specification, namely, the issuance entity, the sharer terminal, the service entity, and the recipient terminal. In some embodiments, the issuance entity and the service entity may be the same server managed by the same manager (e-commerce platform) or may be different servers respectively managed by the e-commerce platform (or a marketing activity organizer, a certain merchant) and a service platform independently, nevertheless data can be exchanged between the issuance entity and the service entity. In some other embodiments, there may be one or more issuance entities, and all electronic coupon links generated by the one or more issuance entities may be shared by the sharer and stored in the service entity.

When the issuance entity and the service entity are the same server, the sharer terminal corresponds to an e-commerce application at the software level, and the sharer completes the electronic consumption and electronic coupon link sharing in an interface of the e-commerce application. The recipient terminal also corresponds to the e-commerce application at the software level, and the recipient obtains an electronic coupon link and performs electronic consumption in the interface of the e-commerce application. Parameters in the interface displayed by the e-commerce application are provided by the server.

When the issuance entity and the service entity are independent of each other, the sharer terminal corresponds to two applications at the software level, namely, an e-commerce application and a service application. The sharer completes the electronic consumption in an interface of the e-commerce application and triggers an interactive control to be switched to the service application for completing the electronic coupon link sharing. The recipient terminal also corresponds to the e-commerce application and service application at the software level, and the recipient completes the obtaining of the electronic coupon link in the interface of the service application and launches the e-commerce application for electronic consumption. Parameters in the interface displayed by the e-commerce application are provided by the server of the issuance entity, and parameters in an interface displayed by the service application are provided by the server of the service entity. For the convenience of description, illustration is made below by taking that the issuance entity and the service entity are independent of each other as an example.

Figure 4A:
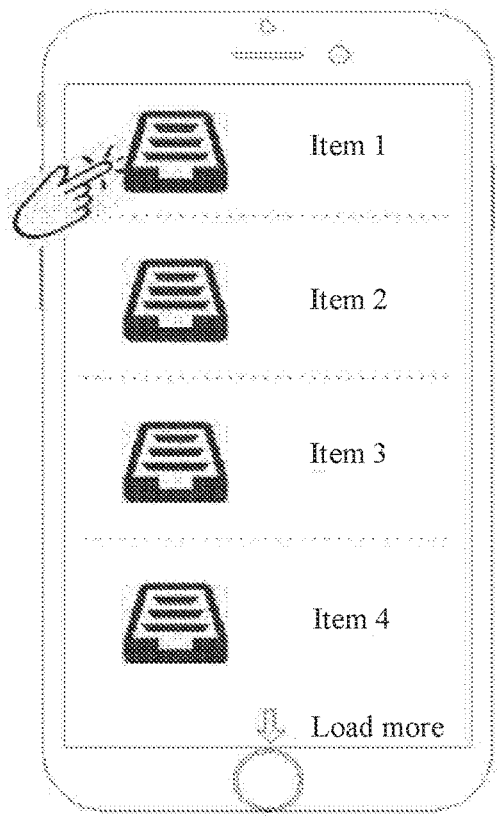
FIG. 4a to FIG. 4c are schematic diagrams of an interface of a service application according to some embodiments of this specification.

FIG. 4a is a schematic diagram of an interface of a service application according to some embodiments of this specification. As shown in FIG. 4a, after the recipient launches the service application, storage pool identifiers of a plurality of storage pools may be displayed in the interface of the service entity, and the recipient may click to select a certain storage pool identifier (such as item 1), thus sending a first selection instruction including the storage pool identifier to the service entity. After receiving the first selection instruction, the service entity may determine, according to the storage pool identifier included in the first selection instruction, the storage pool corresponding to the storage pool identifier from the plurality of storage pools, and then send the electronic coupon link stored in the determined storage pool to the recipient terminal.

The service entity may send all the electronic coupon links in the storage pool selected by the recipient to the receiving client. However, considering that the electronic coupon link in the storage pool is massive and the number of electronic coupons that the recipient wants to receive is limited, a part of the electronic coupon links in the storage pool may be sent to the recipient terminal. In some embodiments, the service entity may send all or some of the electronic coupon links stored in the storage pool to the recipient terminal regardless of the specific manner of sending the electronic coupon links stored in the storage pool to the recipient terminal.

Figure 4B:
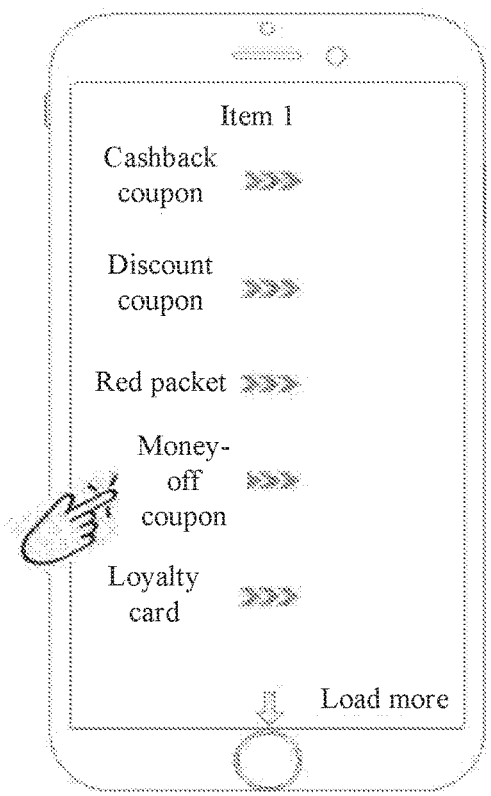

FIG. 4b is a schematic diagram of another interface of a service application according to some embodiments of this specification. As shown in FIG. 4b, after the recipient selects to receive the electronic coupon in item 1, group identifiers of a plurality of groups of electronic coupon links stored in the storage pool corresponding to item 1 are displayed in the interface of the service application. The recipient selects the group of reduction coupons, equivalent to sending a second selection instruction including the group identifier to the service entity. The service entity may determine the group corresponding to the group identifier according to the group identifier and send the electronic coupon link included in the determined group to the recipient terminal.

In addition, the service entity may determine, according to a record of electronic coupon links historically obtained by the recipient terminal from the service entity, the to-be-sent electronic coupon links from the electronic coupon links stored in the storage pool; and send the determined electronic coupon links to the recipient terminal.

After receiving the first selection instruction, the service entity may determine, according to the record of the electronic coupon links historically obtained by the recipient terminal from the service entity, the first attributes and/or second attributes of electronic coupon links preferred by the recipient terminal, and determine the to-be-sent electronic coupon links according to the determined first attributes and/or second attributes.

In one example, the service entity may analyze, according to the record, a merchant identifier, an electronic coupon type, an item identifier, and the like corresponding to the electronic coupon link determined according to the preference of the recipient terminal. When the recipient terminal requests obtaining the electronic coupon link again, the service entity sends the preferred electronic coupon link to the recipient terminal.

The service entity may also determine, according to the record of the electronic coupon links historically obtained by the recipient terminal from the service entity, first attributes and/or second attributes of the electronic coupon links obtained by the recipient terminal, and determine the to-be-sent electronic coupon links according to the determined first attributes and/or second attributes.

In one example, according to the record, the service entity may not determine an electronic coupon link that the user has obtained more than a preset number of times as the to-be-sent electronic coupon link, or not determine an electronic coupon link corresponding to the first attribute and/or second attribute of the electronic coupon link that the user has obtained more than a preset number of times as a to-be-sent electronic coupon link.

In addition, as mentioned above, a sharer is granted by the issuance entity with the qualification to share electronic coupons. The issuance entity can also set a pre-determined number of times that the electronic coupon can be shared by the sharer. After the number of times the electronic coupon is received reaches the pre-determined number of times, the sharer can be considered as successful in sharing the electronic coupons at hand, and the issuance entity will give the sharer a certain reward. The pre-determined number of times is a number of valid times of the electronic coupon link. In other words, after the number of times an electronic coupon link has been accessed reaches the number of valid times, the next time the electronic coupon link is accessed by a recipient, the recipient cannot receive the electronic coupon, because all electronic coupons corresponding to the electronic coupon link have been received.

Figure 1C:
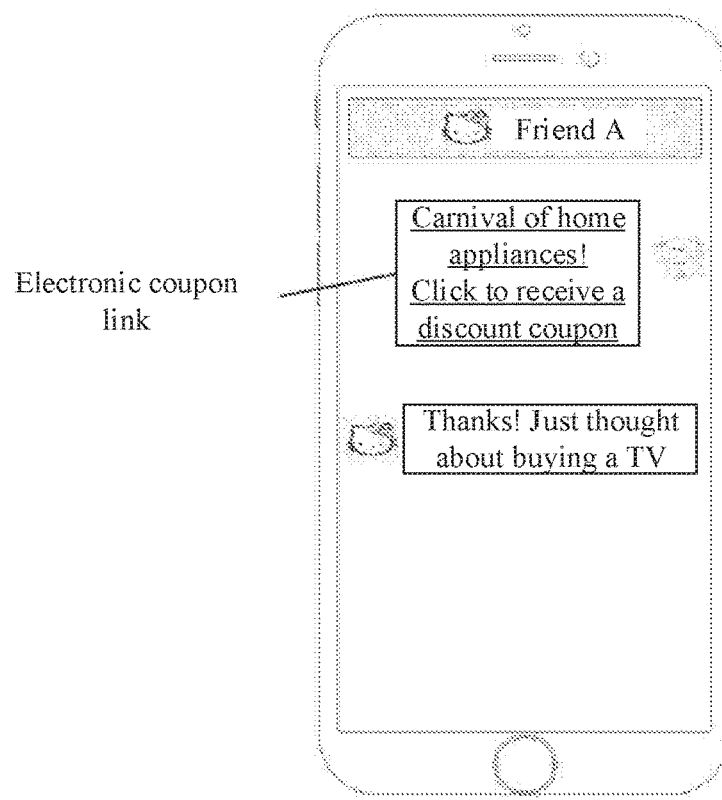
Figure 1D:
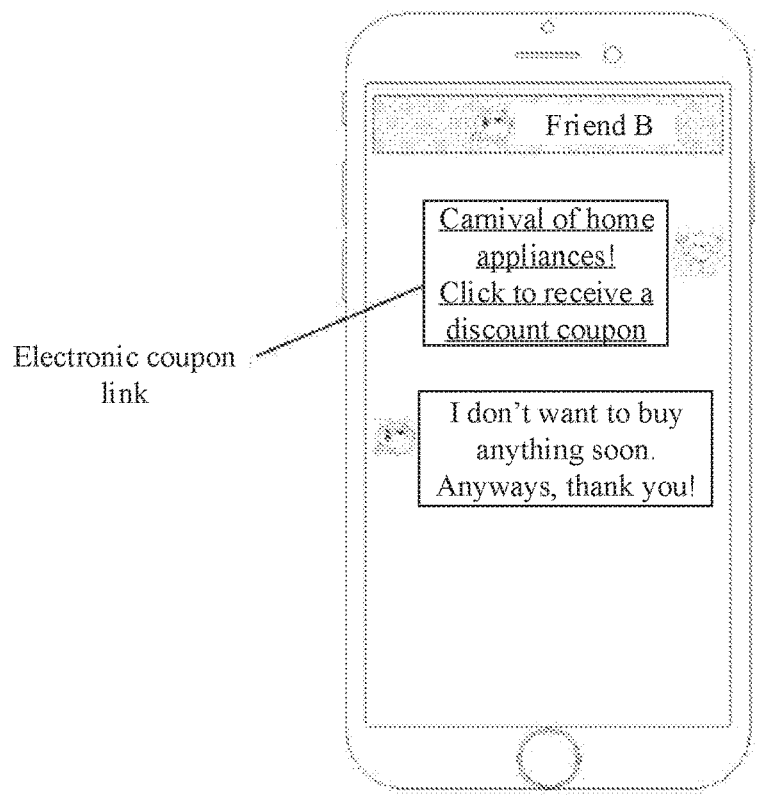

In the current technologies, as shown in FIG. 1c, the friend A may not be able to successfully obtain the electronic coupon by clicking on the electronic coupon link, the electronic coupons corresponding to the electronic coupon link may have been received by other users, and it is equivalent to that the friend A performs a useless operation.

In this specification, the service entity may send a valid electronic coupon link stored in the storage pool to the recipient terminal. In this way, the recipient may receive an electronic coupon by accessing any of the electronic coupon links obtained, and the recipient will not perform useless operations.

In one example, for each electronic coupon link stored in the storage pool, the service entity may query the issuance entity that generates the electronic coupon link for whether the electronic coupon link is valid, and obtain the number of valid times of the electronic coupon link; determine the to-be-sent electronic coupon link according to the number of valid times of each valid electronic coupon link stored in the storage pool; and send the determined electronic coupon links to the user terminal.

The electronic coupon link being accessed once is equivalent to that the corresponding electronic coupon is received once, so the issuance entity decreases the number of valid times of the electronic coupon link by one. Therefore, the issuance entity may accurately record the effective numbers of the electronic coupon links. Before the service entity sends an electronic coupon link to the recipient terminal, in order to ensure that the to-be-sent electronic coupon link is valid, the service entity may query the issuance entity instantly for whether each electronic coupon link is valid and the number of valid times of the electronic coupon link.

In some embodiments, the service entity may also record the number of times the electronic coupon corresponding to each stored electronic coupon link is received to calculate and update the number of valid times of each electronic coupon link. When the sharer also shares the electronic coupon to other channels (such as friends and life circles), the number of valid times calculated by the service entity only based on the receiving conditions at the service entity may be not as accurate as the real-time updated number of valid times directly obtained from the issuance entity.

In some other embodiments, the electronic coupon links stored on the service entity are shared by multiple sharers, and each sharer has the need to complete the sharing task. Therefore, to be fair, after determining the valid electronic coupon, the service entity further needs to prioritize and send the electronic coupon link with a greater remaining number of valid times to the recipient terminal, according to the number of valid times of each valid electronic coupon. That is, the priority of each valid electronic coupon link is determined according to the number of valid times of the electronic coupon link. The greater the number of valid times is, the higher the priority is. The to-be-sent electronic coupon link is determined according to the priorities of all valid electronic coupon links.

In one example, a threshold number of times may be calculated according to the number of valid times of each electronic coupon link. For each valid electronic coupon link, if the number of valid times is not less than the threshold number of times, the electronic coupon link is determined as a to-be-sent electronic coupon link. If the number of valid times is less than the threshold number of times, the electronic coupon link is not determined as the to-be-sent electronic coupon link.

The threshold number of times may be obtained by averaging and rounding the number of valid times of each electronic coupon link, or may be obtained by other algorithms. The threshold number may be used as a threshold for determining whether the remaining number of valid times is large, which is not limited in this specification. If the number of valid times of an electronic coupon link is no less than the threshold number of times, the electronic coupon link has a large remaining number of valid times and should be "prioritized".

Based on the solution "the service entity sends the electronic coupon link in the storage pool corresponding to the storage pool instruction to the recipient terminal, according to the first selection instruction that is sent by the recipient terminal and includes the storage pool identifier," three extended implementation manners are further provided in the embodiments of this specification, which are respectively described as follows. 1. The service entity further sends an electronic coupon link in a corresponding group to the recipient terminal according to the second selection instruction sent by the recipient terminal. 2. The service entity determines the to-be-sent electronic coupon link according to a record of the electronic coupon links historically obtained by the recipient terminal. 3. The service entity may only send a valid electronic coupon link, and further determine a to-be-sent electronic coupon link according to the number of valid times of the valid electronic coupon link.

The above-described three extended implementation manners may be implemented separately or combined in pairs, and may also be implemented all together, which is not limited in this specification.

In S210, the recipient terminal displays the electronic coupon link returned by the service entity.

Figure 4C:
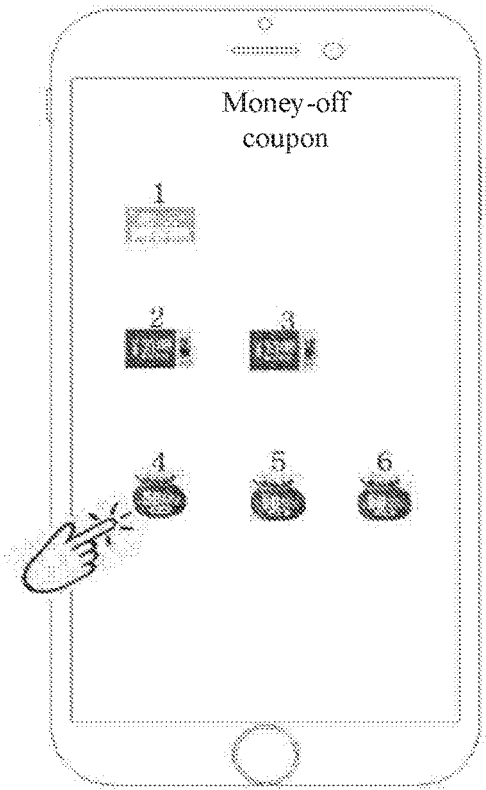

After receiving the electronic coupon link returned by the service entity, the recipient terminal may display the electronic coupon link for the recipient to access the electronic coupon link by interacting with the interface. FIG. 4c is a schematic diagram of another interface of a service application according to some embodiments of this specification. As shown in FIG. 4c, the recipient terminal displays six electronic coupon links, wherein link 2 and link 3 correspond to a same electronic coupon, and links 4 to 6 correspond to another same electronic coupon.

In some embodiments, link 2 and link 3 may be different electronic coupon links, and links 4 to 6 may also be different electronic coupon links, although the recipients are neither concerned nor aware of that. As mentioned above, one electronic coupon may correspond to different sharers. The electronic coupon links shared by different sharers may correspond to a same electronic coupon, although the electronic coupon links are different. The six electronic coupon links shown in FIG. 4c, whether or not the electronic coupon links correspond to the same electronic coupons, may come from different sharers, and these sharers may also be "prioritized" by the service entity because there are more electronic coupons remaining.

In some other embodiments, some of the electronic coupon links shown in FIG. 4c may come from the same sharer. In other words, the service entity may "give a priority to" a sharer, so that the recipient terminal displays more than one electronic coupon link shared by the sharer. For example, link 4 and link 5 may be identical coupon links shared by A, and link 6 may be shared by B.

In one example, the recipient terminal may receive each valid electronic coupon link returned by the service entity and the number of valid times of each valid electronic coupon link. For each valid electronic coupon link, display N valid electronic coupon links according to the number of valid times of the valid electronic coupon link, here N is a natural number not greater than the number of valid times of the valid electronic coupon link.

The recipient terminal may also receive each valid electronic coupon link returned by the service entity and the number of displaying times M of the each valid electronic coupon link. For each valid electronic coupon link, display M valid electronic coupon links, here M is a natural number not greater than the number of valid times of the valid electronic coupon link.

In short, which electronic coupon links are displayed by the recipient terminal and the number of times each electronic coupon link is displayed may be configured flexibly by the service entity according to receiving conditions of the electronic coupons corresponding to the stored electronic coupon links.

With the method for processing an electronic coupon link shown in FIG. 2, several storage pools are established on the service entity, and the user terminal does not need to share the electronic coupon link to the selected channel multiple times, but only needs to send the electronic coupon link to the service entity. The service entity stores the electronic coupon link in the corresponding storage pool according to the first attribute of the electronic coupon link, and then another user terminal may directly obtain the required electronic coupon link from the storage pool of the service entity. In this way, the convenience of sharing an electronic coupon by a user and receiving the electronic coupon by a recipient may be significantly improved.

In addition, the following technical effects may also be achieved through the embodiments of this specification.

1. An electronic coupon shared by a sharer is available to an unspecified public, which effectively widens the sharing channels of the electronic coupon and increases the efficiency of completing the sharing task by the sharer, thereby improving the convenience of sharing the electronic coupon by the sharer.

2. A recipient may obtain multiple electronic coupons links at one time and receive multiple electronic coupons at one time, and the service entity may guarantee that the electronic coupon link sent every time is valid, so that the recipient may successfully receive the electronic coupon each time the recipient accesses the link, achieving a zero-failure rate.

3. In the current technologies, for the same electronic coupon, after a recipient has accessed to the electronic coupon link to receive the electronic coupon once, if the recipient wants to receive the same electronic coupon again, it often requests either the sharer to share again or the recipient to search through a chat record or life circle record to find the electronic coupon link accessed previously, which is quite inconvenient. With the embodiments of this specification, the recipient terminal may display multiple identical electronic coupons at one time to meet the recipient's requirements all at once. Moreover, the recipient may receive the electronic coupon actively without waiting for the friend to share, thus improving the convenience of receiving the electronic coupon.

4. The service entity may determine the to-be-sent electronic coupon link according to the preset rules and the number of valid times of the electronic coupon link obtained from the issuance entity in real time, and determine how the recipient terminal should display the electronic coupon link. Therefore, coordinated management of sharing tasks of the sharers is realized, reducing the pressure on the server of the issuance entity.

Figure 5:
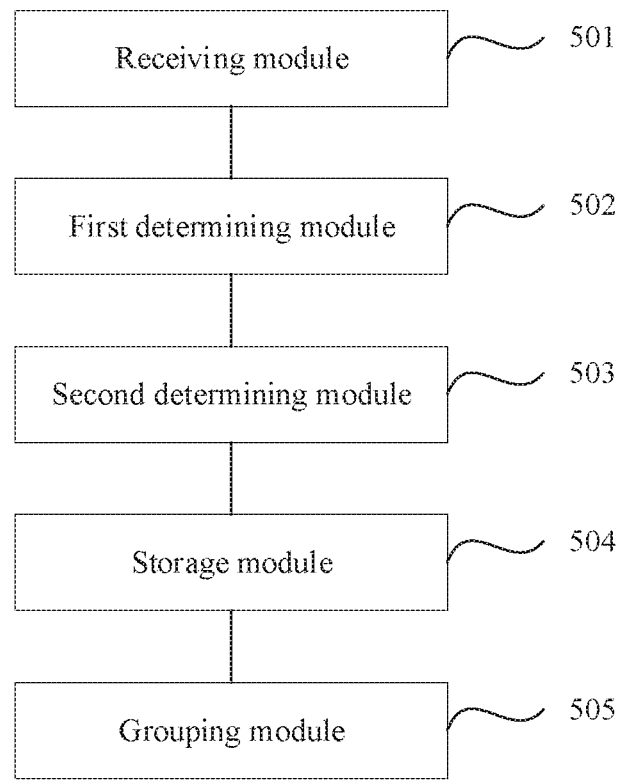
FIG. 5 is a schematic diagram of a device for processing an electronic coupon link according to some embodiments of this specification.

Based on the method for processing an electronic coupon link as shown in FIG. 2, a device for processing an electronic coupon link is further provided correspondingly in the embodiments of this specification. As shown in FIG. 5, the device includes: a receiving module 501 configured to receive an electronic coupon link sent by a user terminal; a first determining module 502 configured to determine a first attribute of the electronic coupon link according to the electronic coupon link; a second determining module 503 configured to determine, according to the first attribute, a storage pool corresponding to the first attribute from a plurality of storage pools; and a storage module 504 configured to store the electronic coupon link in the storage pool corresponding to the first attribute, for another user terminal to obtain the electronic coupon link in the storage pool.

The first determining module 502 queries, according to the electronic coupon link, an issuance entity that generates the electronic coupon link to obtain the first attribute of the electronic coupon link.

The first attribute includes at least one of a merchant identifier corresponding to the electronic coupon link, an item identifier corresponding to the electronic coupon link, and an electronic coupon type corresponding to the electronic coupon link.

The device further includes a grouping module 505 configured to, after the electronic coupon link is stored in the storage pool corresponding to the first attribute, determine a second attribute of the electronic coupon link according to the electronic coupon link; determine a group to which the electronic coupon link belongs according to the second attribute; and add the electronic coupon link to the determined group.

Figure 6:
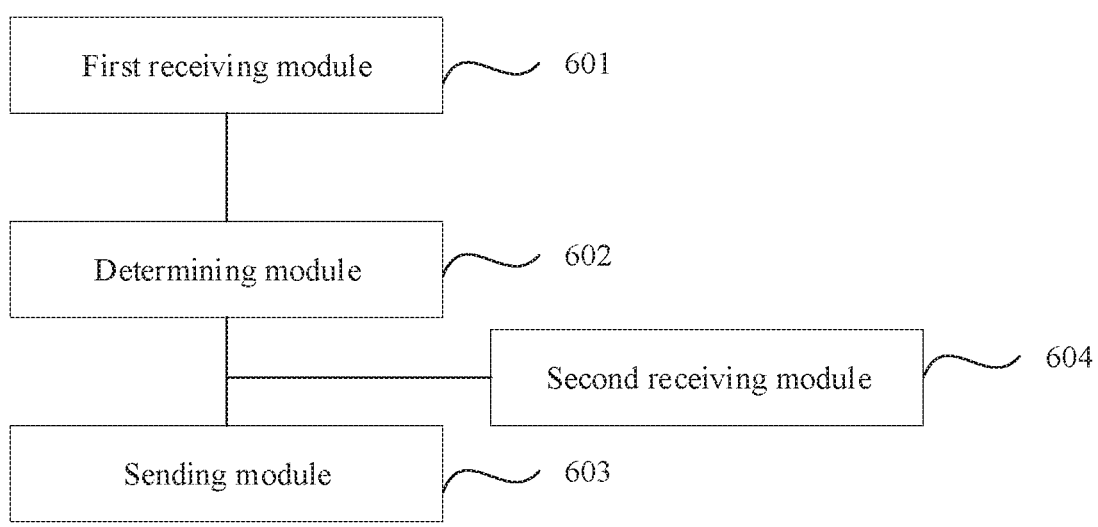
FIG. 6 is a schematic diagram of another device for processing an electronic coupon link according to some embodiments of this specification.

Based on the method for processing an electronic coupon link as shown in FIG. 2, another device for processing an electronic coupon link is further provided correspondingly in the embodiments of this specification. As shown in FIG. 6, the device includes: a first receiving module 601 configured to receive a first selection instruction including a storage pool identifier sent by a user terminal; a determining module 602 configured to determine, according to the storage pool identifier included in the first selection instruction, a storage pool corresponding to the storage pool identifier from a plurality of storage pools; and a sending module 603 configured to send an electronic coupon link stored in the storage pool to the user terminal, wherein the electronic coupon link is stored in the storage pool by the device according to the method shown in FIG. 2.

The sending module 603 is configured to send a valid electronic coupon link stored in the storage pool to the user terminal.

The sending module 603 is configured to, for each electronic coupon link stored in the storage pool, query an issuance entity that generates the electronic coupon link for the validity of the electronic and obtain a number of valid times of the electronic coupon link; determine a to-be-sent electronic coupon link according to the number of valid times of each valid electronic coupon link stored in the storage pool; and send the determined electronic coupon link to the user terminal.

The sending module 603 is configured to determine a priority of each valid electronic coupon link according to the number of valid times of each valid electronic coupon link, wherein the electronic coupon link having a larger number of validity times has a higher priority; and determine the to-be-sent electronic coupon link according to the priorities of all valid electronic coupon links.

The device further includes: a second receiving module 604 configured to, before the electronic coupon link stored in the storage pool is sent to the user terminal, receive a second selection instruction including a group identifier sent by the user terminal.

The sending module 603 is configured to determine a group corresponding to the group identifier according to the group identifier; and send an electronic coupon link included in the determined group to the user terminal.

The sending module 603 is configured to determine, according to a record of electronic coupon links historically obtained by the user terminal from the service entity, a to-be-sent electronic coupon link from the electronic coupon links stored in the storage pool; and send the determined electronic coupon link to the user terminal.

Figure 7:
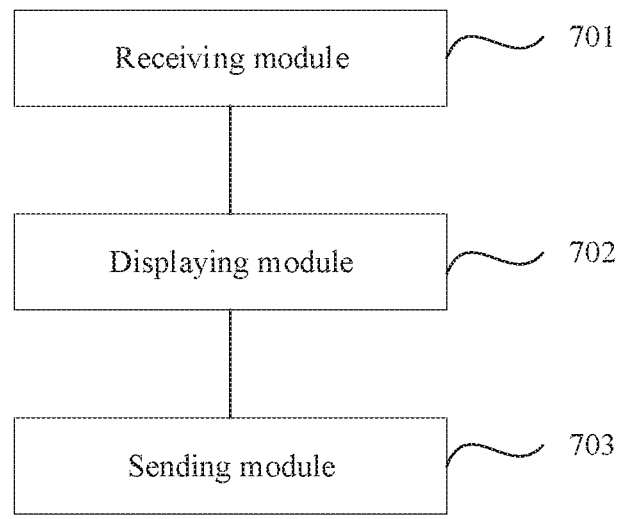
FIG. 7 is a schematic diagram of another device for processing an electronic coupon link according to some embodiments of this specification.

Based on the method for processing an electronic coupon link as shown in FIG. 2, another device for processing an electronic coupon link is further provided correspondingly in the embodiments of this specification. As shown in FIG. 7, the device includes: a receiving module 701 configured to receive an electronic coupon link generated by an issuance entity; a displaying module 702 configured to display an interactive control corresponding to a server entity; and a sending module 703 configured to, when the interactive control is triggered, send the electronic coupon link to the service entity, for the service entity to store the electronic coupon link according to the method shown in FIG. 2.

Figure 8:
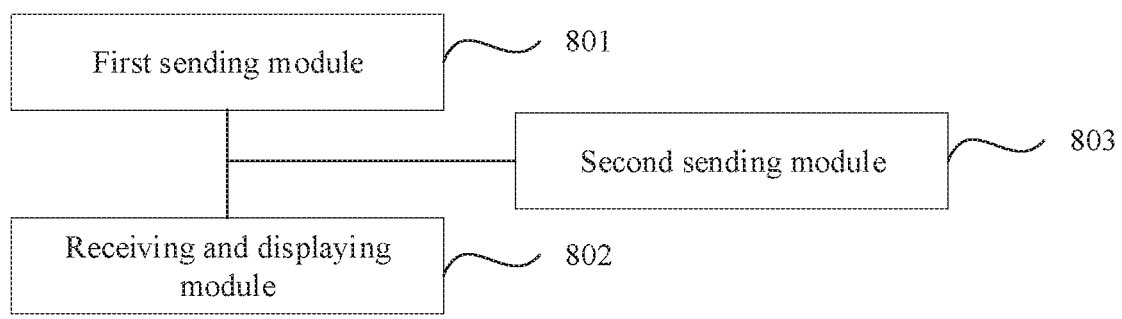
FIG. 8 is a schematic diagram of another device for processing an electronic coupon link according to some embodiments of this specification.

Based on the method for processing an electronic coupon link as shown in FIG. 2, another device for processing an electronic coupon link is further provided correspondingly in the embodiments of this specification. As shown in FIG. 8, the device includes: a first sending module 801 configured to send a first selection instruction including a storage pool identifier to a service entity, for the service entity to return an electronic coupon link stored in a storage pool corresponding to the storage pool identifier, wherein the electronic coupon link is stored in the storage pool by the service entity according to the method shown in FIG. 2; and a receiving and displaying module 802 configured to receive and display the electronic coupon link returned by the service entity.

The device further includes: a second sending module 803 configured to, before the electronic coupon link returned by the service entity is received and displayed, send a second selection instruction including a group identifier to the service entity, for the service entity to return an electronic coupon link, which is included in a group corresponding to the group identifier and stored in the storage pool.

The receiving and displaying module 802 is configured to receive each valid electronic coupon link returned by the service entity and the number of valid times for each valid electronic coupon link; and for each valid electronic coupon link, display N valid electronic coupon links according to the number of valid times of the valid electronic coupon link, wherein N is a natural number not greater than the number of valid times of the valid electronic coupon link.

The present specification may further provide a non-transitory computer-readable storage medium for processing an electronic coupon link. The non-transitory computer-readable storage medium may store instructions executable by one or more processors to cause the one or more processors to perform operations. The operations may include: receiving, by a service entity, an electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

According to another aspect, the present specification also includes another device for processing an electronic coupon link. The device may include one or more processors and a non-transitory computer-readable memory. The non-transitory computer-readable memory is coupled to the one or more processors and configured with instructions executable by the one or more processors to cause the device to perform operations. The operations may include: receiving, by a service entity, the electronic coupon link from a first user terminal; determining a first attribute of the electronic coupon link according to the electronic coupon link; determining, according to the first attribute, a storage pool corresponding to the first attribute from a plurality of storage pools; and storing the electronic coupon link in the storage pool corresponding to the first attribute, for a second user terminal to obtain the electronic coupon link in the storage pool. The storage pool may store one or more electronic coupon links.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it cannot be assumed that the improvement of a method procedure cannot be implemented by a hardware entity module. For example, a Programmable Logic Device (PLD) (for example, a Field Programmable Gate Array (FPGA)) is such an integrated circuit, and logic functions thereof are determined by a user programming devices. Designers program by themselves to "integrate" a digital system into a PLD, without inviting a chip manufacturer to design and manufacture a dedicated integrated circuit chip. Moreover, at present, the programming is mostly implemented by using "logic compiler" software, instead of manually manufacturing an integrated circuit chip. The software is similar to a software complier for developing and writing a program, and original code before compiling also needs to be written in a specific programming language, which is referred to as a Hardware Description Language (HDL). There are many types of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog are most commonly used now. Those skilled in the art also should know that a hardware circuit for implementing the logic method procedure may be easily obtained only by slightly logically programming the method procedure using the above-described several hardware description languages and programming the method procedure into an integrated circuit.

A controller may be implemented in any suitable manner. For example, the controller may be in the form of a microprocessor or a processor and a computer readable medium storing computer readable program codes (for example, software or firmware) executable by the (micro) processor, a logic gate, a switch, an Application Specific Integrated Circuit (ASIC), a programmable logic controller, and an embedded micro-controller. Examples of the controller include, but are not limited to, the following microcontrollers: ARC 625D, Atmel AT91SAM, Microchip PIC18F26K20, and Silicone Labs C8051F320. A memory controller may also be implemented as a part of control logic of a memory. Those skilled in the art also know that, in addition to implementing the controller by using pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and devices included therein and configured to implement various functions may also be considered as structures inside the hardware component. Alternatively, further, the devices configured to implement various functions may be considered as both software modules for implementing the method and structures inside the hardware component.

The system, device, modules or units illustrated in the above-described embodiments may be implemented by a computer chip or an entity or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the device is divided into various modules based on functions, and the modules are described separately. Of course, in an implementation of this specification, functions of various units may also be implemented in one or more pieces of software and/or hardware.

Those skilled in the art should understand that the embodiments of the present specification may be provided as a method, a system, or a computer program product. Therefore, the present specification may be implemented in a form of a complete hardware embodiment, a complete software embodiment, or an embodiment combining software and hardware. Moreover, the present specification may be in the form of a computer program product implemented on one or more computer usable storage media (including, but not limited to, a magnetic disk memory, a CD-ROM, an optical memory and the like) including computer usable program codes.

The present specification is described with reference to flowcharts and/or block diagrams of the method, device (system) and computer program product according to the embodiments of the present specification. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of another programmable data processing device generate a device configured to implement a specified function in one or more processes in the flowcharts and/or in one or more blocks in the block diagrams.

These computer program instructions may also be stored in a computer readable memory that may instruct a computer or another programmable data processing device to work in a particular manner, to cause the instructions stored in the computer readable memory to generate an article of manufacture that includes an instruction device. The instruction device implements a function specified in one or more processes in the flowcharts and/or in one or more blocks in the block diagrams.

These computer program instructions may also be loaded onto a computer or another programmable data processing device, to cause a series of operation steps to be performed on the computer or another programmable device, thus generating computer-implemented processing. Therefore, the instructions executed on the computer or another programmable device provide steps for implementing a function specified in one or more processes in the flowcharts and/or in one or more blocks in the block diagrams.

In a typical configuration, the computing device includes one or more central processing units (CPUs), an input/output interface, a network interface, and a memory.

The memory may include computer readable media such as a volatile memory, a Random Access Memory (RAM), and/or non-volatile memory, e.g., a Read-Only Memory (ROM) or a flash RAM. The memory is an example of a computer readable medium.

The computer readable medium includes non-volatile and volatile media as well as movable and non-movable media and may implement information storage by means of any method or technology. The information may be a computer readable instruction, a data structure, and a module of a program or other data. An example of the storage medium of a computer includes, but is not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

It should be further noted that the terms "include", "comprise" or other variations thereof are intended to cover non-exclusive inclusion, so that a process, method, commodity or device including a series of elements not only includes the elements, but also includes other elements not clearly listed, or further includes elements inherent to the process, method, commodity or device. In the absence of more limitations, an element defined by "including a/an . . . " does not exclude that the process, method, commodity or device including the element further has other identical elements.

Those skilled in the art will appreciate that embodiments of this specification may be provided as a method, system, or computer program product. Thus, this specification may be in the form of a complete hardware embodiment, a complete software embodiment or a combination of software and hardware. Moreover, this specification may be in the form of a computer program product embodied on one or more computer usable storage media (including but not limited to a magnetic disk memory, a CD-ROM, an optical memory, etc.) containing computer usable program codes.

This specification may be described in a general context of a computer executable instruction executed by a computer, for example, a program module. Generally, the program module includes a routine, a program, an object, an assembly, a data structure, and the like for executing a specific task or implementing a specific abstract data type. This specification may also be implemented in distributed computing environments. In the distributed computing environments, a task is executed by remote processing devices connected via a communications network. In the distributed computing environments, the program module may be positioned in local and remote computer storage media including a storage device.

Various embodiments in this specification are described progressively. The same or similar parts between the embodiments may be referenced to one another. In each embodiment, the part that is different from other embodiments is mainly described. Particularly, the system embodiment is described relatively simply because it is similar to the method embodiment, and for related parts, reference may be made to the partial description in the method embodiment.

The above description is merely embodiments of this specification and is not used to limit this specification. For those skilled in the art, this specification may have various alterations and changes. Any modification, equivalent replacement, improvement and the like made without departing from the spirit and principle of this specification should be included in the scope of the claims of this specification.

The invention claimed is:

1. A method for processing an electronic coupon link, comprising:
   receiving, by a server, a first electronic coupon link corresponding to an electronic coupon from a first user terminal;
   determining a first attribute of the first electronic coupon link according to the first electronic coupon link;
   determining, according to the first attribute, a storage pool corresponding to the first attribute from a plurality of storage pools;
   storing the first electronic coupon link in the storage pool corresponding to the first attribute, wherein the storage pool stores one or more electronic coupon links;
   receiving, by the server, a request of accessing the electronic coupon from a second user terminal that has triggered the first electronic coupon link;
   determining, by the server, in response to a first number of times that the first electronic coupon link has been accessed reaching a number of valid times of the first electronic coupon link, the first electronic coupon link as invalid;
   sending, by the server, a second electronic coupon link from the one or more electronic coupon links stored in the storage pool to the second user terminal, wherein the second electronic coupon link is different from the first electronic coupon link and corresponds to the electronic coupon; and
   updating, by the server, a second number of times that the second electronic coupon link has been accessed when the second user terminal triggers the second electronic link.

2. The method of claim 1, wherein the attribute of the first electronic coupon link comprises at least one of a merchant identifier corresponding to the first electronic coupon link, an item identifier corresponding to the first electronic coupon link, and an electronic coupon type corresponding to the first electronic coupon link.

3. The method of claim 1, wherein after the storing the first electronic coupon link in the storage pool corresponding to the first attribute, the method further comprises:
   determining a second attribute of the first electronic coupon link according to the first electronic coupon link;
   determining, according to the second attribute, a group of the first electronic coupon link that the electronic coupon link belongs to; and
   adding the first electronic coupon link to the group.

4. The method of claim 1, further comprising:
   receiving, by the server, a first selection instruction comprising a storage pool identifier from a second user terminal;
   determining, according to the storage pool identifier comprised in the first selection instruction, the storage pool corresponding to the storage pool identifier from the plurality of storage pools; and
   sending a third electronic coupon link from the one or more electronic coupon links stored in the storage pool to the second user terminal.

5. The method of claim 4, wherein the sending a third electronic coupon link from the one or more electronic coupon links stored in the storage pool to the second user terminal comprises:
   determining a validity for each of the one or more electronic coupon links stored in the storage pool;
   obtaining a number of valid times of each valid electronic link;
   determining a priority of the each valid electronic coupon link according to the number of valid times of the each valid electronic coupon link, wherein a larger number of valid times corresponds to a higher priority; and
   determining the third electronic coupon link according to the priority of the each valid electronic coupon link.

6. The method of claim 4, wherein before the sending a third electronic coupon link from the one or more electronic coupon links stored in the storage pool to the second user terminal, the method further comprises:
   receiving a second selection instruction comprising the group identifier from the second user terminal; and
   the step of sending a third electronic coupon link from the one or more electronic coupon links stored in the storage pool to the second user terminal comprises:
   determining a group corresponding to the group identifier according to the group identifier;
   determining an electronic coupon link in the group as the third electronic coupon link; and
   sending the third electronic coupon link to the second user terminal.

7. The method of claim 4, wherein the sending a third electronic coupon link from the one or more electronic coupon links stored in the storage pool to the second user terminal comprises:
- determining, according to a record of electronic coupon links obtained by the second user terminal from the server, the third electronic coupon link from the one or more electronic coupon links stored in the storage pool; and
- sending the third electronic coupon link to the second user terminal.

8. The method of claim 1, wherein the first electronic coupon link includes a user identifier corresponding to the first user for identifying the first user.

9. A device for processing an electronic coupon link, comprising one or more processors and a non-transitory computer-readable memory coupled to the one or more processors and configured with instructions executable by the one or more processors to perform operations comprising:
- receiving a first electronic coupon link corresponding to an electronic coupon from a first user terminal;
- determining a first attribute of the first electronic coupon link according to the first electronic coupon link;
- determining, according to the first attribute, a storage pool corresponding to the first attribute from a plurality of storage pools;
- storing the first electronic coupon link in the storage pool corresponding to the first attribute, wherein the storage pool stores one or more electronic coupon links;
- receiving a request of accessing the electronic coupon from a second user terminal that has triggered the first electronic coupon link;
- determining in response to a first number of times that the first electronic coupon link has been accessed reaching a number of valid times of the first electronic coupon link, the first electronic coupon link as invalid;
- sending a second electronic coupon link from the one or more electronic coupon links stored in the storage pool to the second user terminal, wherein the second electronic coupon link is different from the first electronic coupon link and corresponds to the electronic coupon; and
- updating a second number of times that the second electronic coupon link has been accessed when the second user terminal triggers the second electronic coupon link.

10. The device of claim 9, wherein the attribute of the first electronic coupon link comprises at least one of a merchant identifier corresponding to the first electronic coupon link, an item identifier corresponding to the first electronic coupon link, and an electronic coupon type corresponding to the first electronic coupon link.

11. The device of claim 9, wherein the operations further comprise:
- determining a second attribute of the first electronic coupon link according to the electronic coupon link;
- determining, according to the second attribute, a group of the first electronic coupon link that the electronic coupon link belongs to; and
- adding the first electronic coupon link to the group.

12. The device of claim 9, wherein the operations further comprise:
- receiving a first selection instruction comprising a storage pool identifier from a second user terminal;
- determining, according to the storage pool identifier comprised in the first selection instruction, the storage pool corresponding to the storage pool identifier from the plurality of storage pools; and
- sending a third electronic coupon link from the one or more electronic coupon links stored in the storage pool to the second user terminal.

13. The device of claim 12, wherein the sending a third electronic coupon link from the one or more electronic coupon links stored in the storage pool to the second user terminal comprises:
- determining a validity for each of the one or more electronic coupon links stored in the storage pool;
- obtaining a number of valid times of each valid electronic link;
- determining a priority of the each valid electronic coupon link according to the number of valid times of the each valid electronic coupon link, wherein a larger number of valid times corresponds to a higher priority; and
- determining an electronic coupon link according to the priority of the each valid electronic coupon link.

14. The device of claim 12, wherein before the sending a third electronic coupon link from the one or more electronic coupon links stored in the storage pool to the second user terminal, the operations further comprise:
- receiving a second selection instruction comprising the group identifier from the second user terminal; and
- the step of sending a third electronic coupon link from the one or more electronic coupon links stored in the storage pool to the second user terminal comprises:
- determining the group corresponding to the group identifier according to the group identifier;
- determining an electronic coupon link in the group as the third electronic coupon link; and
- sending the third coupon link to the second user terminal.

15. The device of claim 12, wherein the sending a third electronic coupon link from the one or more electronic coupon links stored in the storage pool to the second user terminal comprises:
- determining, according to a record of electronic coupon links obtained by the second user terminal from a server, the third electronic coupon link from the one or more electronic coupon links stored in the storage pool; and
- sending the third electronic coupon link to the second user terminal.

16. The device of claim 9, wherein the first electronic coupon link includes a user identifier corresponding to the first user for identifying the first user.

17. A non-transitory computer-readable storage medium for processing an electronic coupon link, storing instructions executable by one or more processors to cause the one or more processors to perform operations comprising:
- receiving a first electronic coupon link corresponding to an electronic coupon from a first user terminal;
- determining a first attribute of the first electronic coupon link according to the first electronic coupon link;
- determining, according to the first attribute, a storage pool corresponding to the first attribute from a plurality of storage pools;
- storing the first electronic coupon link in the storage pool corresponding to the first attribute, wherein the storage pool stores one or more electronic coupon links;
- receiving a request of accessing the electronic coupon from a second user terminal that has triggered the first electronic coupon link;
- determining in response to a first number of times that the first electronic coupon link has been accessed reaching a number of valid times of the first electronic coupon link, the first electronic coupon link as invalid;

sending a second electronic coupon link from the one or more electronic coupon links stored in the storage pool to the second user terminal, wherein the second electronic coupon link is different from the first electronic coupon link and corresponds to the electronic coupon; and updating a second number of times that the second electronic coupon link has been accessed when the second user terminal triggers the second electronic coupon link.

18. The non-transitory computer-readable storage medium of claim 17, wherein the operations further comprise:

receiving a first selection instruction comprising a storage pool identifier from a second user terminal;

determining, according to the storage pool identifier comprised in the first selection instruction, the storage pool corresponding to the storage pool identifier from the plurality of storage pools; and sending a third electronic coupon link from the one or more electronic coupon links stored in the storage pool to the second user terminal.

19. The non-transitory computer-readable storage medium of claim 18, wherein the sending a third electronic coupon link from the one or more electronic coupon links stored in the storage pool to the second user terminal comprises:

determining a validity for each of the one or more electronic coupon links stored in the storage pool;

obtaining a number of valid times of each valid electronic link;

determining a priority of the each valid electronic coupon link according to the number of valid times of the each valid electronic coupon link, wherein a larger number of valid times corresponds to a higher priority; and determining the third electronic coupon link according to the priority of the each valid electronic coupon link.

20. The non-transitory computer-readable storage medium of claim 17, wherein the first electronic coupon link includes a user identifier corresponding to the first user for identifying the first user.

* * * * *